US012170913B2

(12) United States Patent
Dalsgaard et al.

(10) Patent No.: US 12,170,913 B2
(45) Date of Patent: Dec. 17, 2024

(54) BALANCING OF RRM MEASUREMENTS

(71) Applicant: Nokia Technologies Oy, Espoo (FI)

(72) Inventors: Lars Dalsgaard, Oulu (FI); Jorma Johannes Kaikkonen, Oulu (FI)

(73) Assignee: NOKIA TECHNOLOGIES OY, Espoo (FI)

(*) Notice: Subject to any disclaimer, the term of this patent is extended or adjusted under 35 U.S.C. 154(b) by 156 days.

(21) Appl. No.: 17/210,316

(22) Filed: Mar. 23, 2021

(65) Prior Publication Data

US 2021/0306884 A1 Sep. 30, 2021

(30) Foreign Application Priority Data

Mar. 25, 2020 (WO) .................. PCT/EP2020/058277

(51) Int. Cl.
*H04L 12/00* (2006.01)
*H04W 24/08* (2009.01)
*H04W 24/10* (2009.01)

(52) U.S. Cl.
CPC ............ *H04W 24/08* (2013.01); *H04W 24/10* (2013.01)

(58) Field of Classification Search
None
See application file for complete search history.

(56) References Cited

U.S. PATENT DOCUMENTS

| 9,338,684 | B2 | 5/2016 | Zhi et al. |
| 9,560,536 | B2 | 1/2017 | Ji et al. |
| 2018/0279312 | A1* | 9/2018 | Dalsgaard ............. H04W 24/10 |
| 2019/0082392 | A1* | 3/2019 | Balasubramanian ........................ H04W 52/0245 |
| 2019/0274146 | A1* | 9/2019 | Tang ..................... H04W 24/08 |
| 2019/0319686 | A1 | 10/2019 | Chen, IV et al. |
| 2019/0364469 | A1 | 11/2019 | Siomina |
| 2020/0052803 | A1* | 2/2020 | Deenoo ............... H04B 17/318 |
| 2020/0128412 | A1* | 4/2020 | Kazmi ............. H04W 36/0085 |
| 2020/0221354 | A1* | 7/2020 | Van der Zee ..... H04W 36/0058 |
| 2020/0322856 | A1* | 10/2020 | Wang .................... H04W 36/04 |

(Continued)

FOREIGN PATENT DOCUMENTS

| CN | 109309938 A | 2/2019 |
| CN | 110381528 A | 10/2019 |

(Continued)

OTHER PUBLICATIONS

Tayyab et al., "A Survey on Handover Management: From LTE to NR", IEEE Access, vol. 7, Aug. 26, 2019, pp. 118907-118930.

(Continued)

*Primary Examiner* — Ajit Patel
*Assistant Examiner* — Lionel Preval
(74) *Attorney, Agent, or Firm* — Robert P. Michal, Esq.; Carter, DeLuca & Farrell LLP

(57) ABSTRACT

The present subject matter relates to a user equipment for cell measurements. The user equipment comprises means configured for: in response to determining that a signal quality of a serving cell of the user equipment fulfils a certain signal condition: performing intra-frequency measurements on a serving carrier of the serving cell if one or more one or more neighboring cells on the serving carrier are identified by the user equipment, otherwise performing at least inter-frequency measurements on a non-serving carrier.

13 Claims, 6 Drawing Sheets

(56) References Cited

U.S. PATENT DOCUMENTS

| | | | | |
|---|---|---|---|---|
| 2021/0168745 A1* | 6/2021 | Harada | ............... | H04W 56/001 |
| 2021/0211919 A1* | 7/2021 | Chen | ................. | H04W 52/0229 |
| 2021/0321335 A1* | 10/2021 | Xu | ........................ | H04W 24/10 |
| 2022/0046499 A1* | 2/2022 | Lu | ..................... | H04W 36/0085 |
| 2022/0322193 A1* | 10/2022 | Tao | ................... | H04W 36/0058 |
| 2023/0078923 A1* | 3/2023 | Shi | .................... | H04W 52/0258 370/311 |

FOREIGN PATENT DOCUMENTS

| | | |
|---|---|---|
| WO | 2019/095277 A1 | 5/2019 |
| WO | 2019/193125 A1 | 10/2019 |

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 15)", 3GPP TS 36.304, V15.5.0, Dec. 2019, pp. 1-55.

"3rd Generation Partnership Project; Technical Specification Group Radio Access Network; NR; Requirements for support of radio resource management(Release 16)", 3GPP TS 38.133, V16.2.0, Dec. 2019, pp. 1-1130.

"Discussion on SMTC configuration in FR2", 3GPP TSG-RAN WG4 Meeting#94-e, R4-2001330, Agenda : 6.10.4, Nokia, Feb. 24-06, 2020, 4 pages.

International Search Report and Written Opinion received for corresponding Patent Cooperation Treaty Application No. PCT/EP2020/058277, dated Dec. 2, 2020, 13 pages.

Office action received for corresponding European Patent Application No. 20714559.0, dated Sep. 6, 2023, 6 pages.

Notification for the Opinion of Examination received for corresponding Taiwan Patent Application No. 110108907, dated Feb. 29, 2024, 8 pages of Notification for the Opinion of Examination and 8 pages of translation available.

* cited by examiner

BALANCING OF RRM MEASUREMENTS

TECHNICAL FIELD

Various example embodiments relate to computer networking, and more particularly to a user equipment for neighboring cell measurements.

BACKGROUND

The 5th generation wireless networks (5G) refer to a new generation of radio systems and network architecture. 5G is expected to provide higher bitrates and coverage than the current long term evolution (LTE) systems. 5G is also expected to increase network expandability up to hundreds of thousands of connections. However, there is a need to improve cell measurements in such systems.

SUMMARY

Example embodiments provide a user equipment for cell measurements. The user equipment comprises means configured for: in response to determining that a signal quality of a serving cell of the user equipment fulfils a certain signal condition:
performing intra-frequency measurements on a serving carrier of the serving cell if one or more one or more neighboring cells on the serving carrier are identified by the user equipment, otherwise performing at least inter-frequency measurements on a non-serving carrier.

Example embodiments provide a user equipment comprising means configured for:
identifying zero or more intra-frequency neighboring cells on the serving carrier, in response to determining that a signal quality of a serving cell of the user equipment fulfils a certain signal condition:
if one or more intra-frequency cells are identified by the user equipment, performing intra-frequency measurements on a serving carrier of the serving cell, otherwise performing at least inter-frequency measurements on a non-serving carrier.

According to further example embodiments, a method used in a user equipment is provided. The method comprises: in response to determining that a signal quality of a serving cell of the user equipment fulfils a certain signal condition: performing intra-frequency measurements on a serving carrier of the serving cell if one or more one or more neighboring cells on the serving carrier are identified by the user equipment, otherwise performing at least inter-frequency measurements on one or more non-serving carriers.

According to further example embodiments, a computer program product comprises instructions stored thereon for causing a user equipment for performing at least the following: in response to determining that a signal quality of a serving cell of the user equipment fulfils a certain signal condition: performing intra-frequency measurements on a serving carrier of the serving cell if one or more one or more neighboring cells on the serving carrier are identified by the user equipment, otherwise performing at least inter-frequency measurements on one or more non-serving carriers.

According to further example embodiments, a user equipment for cell measurements comprises means being configured for: determining if a measurement threshold is set for a serving cell on a serving carrier of the user equipment, wherein the measurement threshold indicates when the user equipment is required to perform inter-frequency measurements, in response to determining that that the measurement threshold is set:
determining whether the signal quality of the serving cell exceeds the measurement threshold, in response to determining that signal quality exceeds the measurement threshold, searching for at least one neighboring cell on the serving carrier, and in response to identifying at least one neighboring cell on the serving carrier, performing the intra-frequency measurements on the serving carrier and inter-frequency measurements on a non-serving carrier.

According to further example embodiments, an apparatus comprises means configured for configuring a user equipment to perform: in response to determining that a signal quality of a serving cell of the user equipment fulfils a certain signal condition: performing intra-frequency measurements on a serving carrier of the serving cell if one or more one or more neighboring cells on the serving carrier are identified by the user equipment, otherwise performing at least inter-frequency measurements on a non-serving carrier. The means comprises at least one processor; and at least one memory including computer program code, the at least one memory and the computer program code being configured to, with the at least one processor, cause the performance of the apparatus.

BRIEF DESCRIPTION OF THE DRAWINGS

The accompanying figures are included to provide a further understanding of examples, and are incorporated in and constitute part of this specification. In the figures.

DETAILED DESCRIPTION

Figure 1:
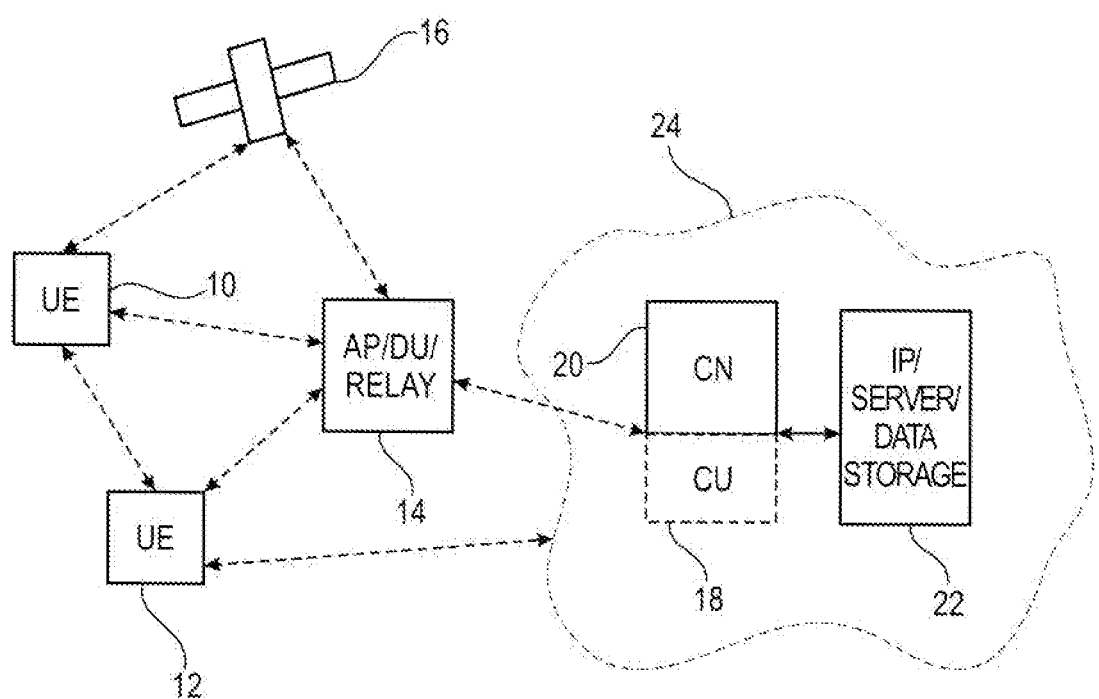
FIG. 1 illustrates a part of an exemplifying radio access network.

In the following description, for purposes of explanation and not limitation, specific details are set forth such as particular architectures, interfaces, techniques, etc., in order to provide a thorough understanding of the examples. However, it will be apparent to those skilled in the art that the disclosed subject matter may be practiced in other illustrative examples that depart from these specific details. In some instances, detailed descriptions of well-known devices and/or methods are omitted so as not to obscure the description with unnecessary detail.

Cell measurement may be a very important step for mobility and channel quality estimation in cellular systems. The cell measurement may be a radio resource management (RRM) measurement. The cell measurement may be performed by the user equipment in connected mode, inactive mode or idle mode. The cell measurement may involve an acquisition of time and frequency synchronization with the cell. For that, the user equipment may use synchronization signals. The synchronization signals are transmitted by network nodes on different carriers. The synchronization signals on different carriers may need to be synchronized to the level that they would have to occur simultaneously in a time domain as otherwise the user equipment may not be able to measure the different carriers. The transmission of the synchronization signals is subject to system requirements such as 5G requirements. For example, the radio access technology 5G new radio (NR) is designed accounting network power saving opportunities and hence it only provides synchronization signal blocks (SSBs) on a periodic basis. For example, these SSBs may be transmitted by a node gNB on each downlink (DL) beam with a given periodicity varying between 5 milliseconds and 160 milliseconds. The synchronization signals SSBs provided herein are not limiting and provided for exemplification only.

A cell of the communication system may be a radio network object that can be uniquely identified by a user equipment. This identification may, for example, be performed using a cell identification signal that is broadcasted over a geographical area from one access point such as gNB. A serving cell as used herein refers to a cell that serves a user equipment in connected mode or idle mode or inactive mode.

Measuring a cell may, for example, be performed by measuring (e.g. a power) of at least one beam of the cell. The measurements results may be combined (e.g. averaged) to derive a signal quality or cell quality of the cell. The signal quality may, for example, be a reference signal received power (RSRP) or reference signal received quality (RSRQ) measurement.

Cell measurements may be intra-frequency measurement, inter-frequency measurements or measurements of another radio access technology (RAT) than NR-inter-RAT measurements. The intra-frequency measurement is a measurement of a cell on the same carrier as the serving cell. The intra-frequency measurement comprises the measurement of the serving cell and/or the measurement of one or more neighboring cells on a same carrier of the serving cell. For example, an intra-frequency measurement of a neighbor cell may be performed if the center frequency of the SSB of the serving cell and the center frequency of the SSB of the neighbor cell are the same, and the subcarrier spacing of the two SSBs is also the same.

The inter-frequency measurement is in general a measurement of the same RAT as the serving cell but on a carrier on which there is no serving cell e.g. a measurement at a carrier different from the carrier of the serving cell. For example, an inter-frequency measurement of a neighbor cell may be performed if the center frequency of the SSB of the serving cell and the center frequency of the SSB of the neighbor cell are different.

In a first inter-frequency measurement example, the user equipment may be configured to perform the inter-frequency measurements without the need of a measurement gap. For example, the user equipment may measure the cell quality of a cell on a predetermined carrier using an unused receiver of the user equipment. Therefore, the user equipment may not need a measurement gap for performing the inter-frequency measurements.

In a second inter-frequency measurement example, the inter-frequency measurements may be performed using a method in which the user equipment is configured with measurement gaps. During a measurement gap, the user equipment is allowed to stop reception and transmission on the serving cell/carrier, switch to the non-serving carrier, perform the measurements, and switch back to the serving cell/carrier. However, the gap-assisted measurements may be introducing limitations, in particular in a 5G NR system, for the following reasons. In order to enable the gap-assisted measurements, the SSB of the measured non-serving carrier might have to be within the measurement gap. That is, the SSBs (and therefore an SSB measurement timing configuration, SMTC) have to be synchronized among the different carriers to be measured within the gap. However, due to the transmission periodicity of the SSBs, the number of carriers that can be searched and measured per gap/SSB/SMTC occasion may be a limited number. For example, if the user equipment supports only a limited number of searchers, e.g. two searchers, the user equipment may be limited to measure less than e.g. three carriers in parallel. In addition to the limited number of carriers that can be measured in parallel, only part of measurement opportunities may be available for intra-frequency measurements for the following reasons. In a 5G NR frequency band, FR2, the NR is assumed to be synchronized and the user equipment are assumed to use receiver beam forming. However, the user equipment may only receive in one direction at any time. This means the user equipment may not be able to measure SSB from cell 1 in one direction and at the same time receive an SSB from cell 2 in another direction. This also means that the user equipment in some cases may have to split the measurement opportunities (SSB's) between intra-frequency and inter-frequency measurements.

The present subject matter may provide a solution to these problems. For example, a user equipment for neighboring cell measurements in a communication system is provided. The communication system may use a same RAT or different RATs. The user equipment may be configured to perform a measurement of a neighboring cell in case a synchronization signal of said neighboring cell is synchronized with a synchronization signal of the serving cell. The communication system comprises a serving cell of the user equipment, at least one first neighboring cell on a same carrier of the serving cell and at least one second neighboring cell on a carrier different from the carrier of the serving cell.

The user equipment comprises means configured for: dependent upon a signal quality of the serving cell, performing a measurement sharing method or a measurement prioritization method.

For example, the means is configured for: in response to determining that the signal quality of the serving cell fulfils a certain signal condition performing the measurement sharing method, otherwise performing the measurement prioritization method. The certain signal condition may be a predefined signal condition. The measurement prioritization method may be performed outside measurement gaps. The certain signal condition may require a signal quality of the serving cell lower than a first minimum quality threshold. The first minimum quality threshold may, for example, be user defined. In another example, the first minimum quality threshold may be set dynamically on the fly e.g. the first minimum quality threshold may be set depending on the time and/or the location of the measurements.

The measurement sharing method may in one example be a default measurement method of the user equipment. The measurement sharing method may be based on a sharing split between intra-frequency measurements and inter-frequency measurements. For example, the user equipment may share its resources between the intra-frequency and inter-frequency measurements. The measurement sharing method may be performed regardless of identified intra-frequency cells status or conditions. Alternatively, or in addition, the measurement sharing method may in another example also be based on sharing measurement resources or occurrences between non gap assisted measurements and gap assisted measurements. As one example, the non-gap assisted measurements may be intra-frequency measurements and gap assisted measurements may be inter-frequency measurements.

The measurement prioritization method may give a highest priority to the intra-frequency measurements of neighboring cells on the serving carrier e.g. at low conditions of the serving cell. The measurement prioritization method may comprise a first group of measurements or a second group of measurements. The first group of measurements is performed if one or more one first neighboring cells of the first neighboring cells of the communication system are identified by the user equipment. The second group of measurements is performed if no first neighboring cell is identified by the user equipment.

The first group of measurements comprises intra-frequency measurements on a serving carrier of the serving cell and excluding some or all of the inter-frequency measurements that can be performed by the user equipment. For example, the first group of measurements comprises intra-frequency measurements on a serving carrier of the serving cell and may exclude some or all inter-frequency measurements and may exclude inter-RAT measurements. Excluding only part of inter-frequency measurements may be advantageous as the UE may perform some inter-frequency measurements at occasions where intra-frequency measurements cannot be performed. The first group of measurements comprises intra-frequency measurements of the identified first neighboring cells and intra-frequency measurements of the serving cell.

In one example, the second group of measurements comprises inter-frequency measurements on the non-serving carrier and may exclude the intra-frequency measurements.

In another example, the second group of measurements comprises intra-frequency measurements of the serving cell on the serving carrier and inter-frequency measurements on the non-serving carrier. The second group of measurements may exclude measurements of a cell of a radio access technology different from the radio access technology of the serving cell.

The measurement prioritization method may be advantageous because it enables the user equipment, when needed, to shift the measurement effort and have more or all measurement opportunities available for intra-frequency measurements. In particular, the measurement prioritization method may be advantageous when the user equipment is at the cell edge. For example, not having all measurement opportunities available for intra-frequency measurements at the cell edge, may impact the intra-frequency measurements delay and timely reporting, which could impact mobility performance and robustness. This may lead to mobility errors (e.g. handover failures, radio link failures etc.).

The measurement sharing method may be advantageous as it may enable a seamless integration of the present subject matter with existing systems. The measurement sharing method may further be advantageous if the user equipment is at the cell edge. If the user equipment is at the cell edge or moving at higher velocity it may be important to perform faster intra-frequency measurements to enable timely reporting to ensure a robust mobility.

Hence, the present subject matter may ensure better mobility measurements for the user equipment possibly based on the deployment of the communication system. In particular, the present subject matter may define signalling and/or user equipment behaviour to control the user equipment measurement to ensure maximization of the measurement availability targeted at a most urgent object. This may enable focused measurements based on current measurement status and measurement need.

In one example, the measurement prioritization method may be performed if the user equipment is configured to apply UE power savings e.g. the user equipment may apply reduced measurements by using longer measurement intervals and/or longer measurement evaluation time. This may be advantageous as the prioritization of measurements may, for example, be based on configurations of mobility measurement relaxations of NR. In one example, if the user equipment has not detected any intra-frequency cells, the user equipment may use all possible available measurement occasions to search and measure intra-frequency cells before searching and measuring inter-frequency cells. In another example, if the user equipment has detected an intra-frequency cell and the serving cell quality fulfils the certain signal condition, the user equipment may only perform intra-frequency measurements.

In one example, the measurement prioritization method may be performed based on UE radio link monitoring (RLM). In one example, the user equipment may perform the measurement prioritization method if the user equipment detects one or more link reliability problems. A link reliability problem may be detected if, for example, one or more out-of-synchronization occasions have been detected by the UE or the RLM guard timer is started. Additionally or alternatively, the UE may perform the measurement prioritization method and prioritize intra-frequency measurements if the UE detects beam level reliability problems. A beam level reliability problem may be detected if, for example, a beam failure has been detected and/or the UE is searching for candidate beams due to a beam failure.

In one example, an apparatus is provided. The apparatus may, for example, be a base station apparatus. The apparatus may, for example, be configured to be employed within an gNB. The apparatus comprises means configured for configuring a user equipment to perform: in response to determining that a signal quality of a serving cell of the user equipment fulfils a certain signal condition: performing intra-frequency measurements on a serving carrier of the serving cell if one or more one or more intra-frequency neighboring cells on the serving carrier are identified by the user equipment, otherwise performing at least inter-frequency measurements on a non-serving carrier.

In one example, an apparatus is provided. The apparatus may, for example, be a base station apparatus. The apparatus may, for example, be configured to be employed within an gNB. The apparatus comprises means configured for generating a measurement control message for a user equipment and transmitting the generated measurement control message to the user equipment. The measurement control message indicates to the user equipment to perform the measurement sharing method or the measurement prioritization method dependent upon a signal quality of the serving cell. In response to the transmitting of the generated measurement control message, the apparatus may be receiving a report message from the user equipment. The report message comprises the preformed measurements by the user equipment in accordance with the measurement control message. For example, the measurement control message may comprise a quality threshold for checking a signal condition of the serving cell, and may indicate whether the user equipment shall measure intra-frequency cells or inter-frequency cells.

According to an example, the means is configured for: in response to determining that the signal quality of the serving cell does not fulfil the certain signal condition: performing inter-frequency measurements on the non-serving carrier and intra-frequency measurements on the serving carrier. For example, the inter-frequency measurements on the non-serving carrier may exclude inter-RAT measurements.

According to an example, the means is configured for: in response to determining that the signal quality of the serving cell fulfils the certain signal condition and no intra-frequency neighboring cell on the serving carrier is identified by the user equipment: determining if the signal quality of the serving cell fulfils another certain signal condition, in case the signal quality of the serving cell fulfils the other certain signal condition, performing the inter-frequency measurements on the non-serving carrier, otherwise performing the intra-frequency measurements on the serving carrier and inter-frequency measurements on the non-serving carrier.

The other certain signal condition may require a signal quality of the serving cell below a second minimum quality threshold. The second minimum quality threshold may be smaller than the first minimum quality threshold. This may enable an efficient control of the measurements performed by the user equipment.

According to an example, the means is configured for: in response to determining that the signal quality of the serving cell fulfils the certain signal condition and no intra-frequency neighboring cell on the serving carrier is identified by the user equipment: performing intra-frequency measurements on the serving carrier and inter-frequency measurements on the non-serving carrier for a predefined time period, and after the time period has lapsed stopping the intra-frequency measurements and continuing the performing of the inter-frequency measurements on the non-serving carrier. The measurements may exclude inter-RAT measurements.

According to an example, if the number of detected intra-frequency cells is lower than a certain predefined/configured number over a certain time, the presence of the neighboring cells may be detected and the user equipment may perform intra-frequency measurements on a serving carrier of the serving cell.

According to an example, one or more cells of the identified intra-frequency neighboring cells has a signal quality that fulfils a certain signal quality selection criterion. For example, the signal quality selection criterion may require the neighbour cell quality exceeding a predefined absolute threshold or a relative threshold (compared to the serving cell).

According to an example, a number of synchronization signal blocks (SSBs) received from each of the identified neighboring cells is higher than a threshold and/or signal values of the SSBs fulfils a quality metric.

According to an example, the user equipment has a user equipment state, wherein the user equipment state is a connected state, inactive state or idle state. For example, the user equipment state may be an RRC_IDLE state, RRC_INACTIVE state or RRC_CONNECTED state as defined for 5G NR systems.

According to an example, the communication system supports a same radio access technology or different radio access technologies. The supported radio access technology may, for example, be a 5G NR access technology.

The above-mentioned problems may additionally be solved as follows. The means of the user equipment may be configured for: determining if a measurement threshold is set for a serving cell on a serving carrier of the user equipment, wherein the measurement threshold indicates when the user equipment is required to balance cell measurements between intra- and inter-frequency and inter-RAT measurements. In response to determining that the measurement threshold is set: determining whether the signal quality of the serving cell exceeds the measurement threshold. In response to determining that the signal quality exceeds the measurement threshold, searching for and/or measuring at least one neighboring cell on the serving carrier. In response to identifying at least one neighboring cell on the serving carrier, performing the measurements according to the applicable measurement method. That is, the means may be configured to perform intra-frequency measurements on the serving carrier and inter-frequency measurements on a non-serving carrier. Balancing cell measurements between intra- and inter-frequency measurements may, for example, be performed as described with the measurement sharing method or prioritization method.

The measurement threshold may be a network configurable threshold. In one example, the measurement threshold may be provided so that the determination whether the signal quality of the serving cell exceeds the measurement threshold comprises determining whether the signal quality of the serving cell is higher than the measurement threshold. In another example, the measurement threshold may be provided so that the determination whether the signal quality of the serving cell exceeds the measurement threshold comprises determining whether the signal quality of the serving cell is lower than the measurement threshold.

In other words, the user equipment will search for intra-frequency cells and use all measurement occasions for intra-frequency searches until at least one intra-frequency cell has been detected. Hereafter, also other measurements—e.g. inter-frequency measurements—may be performed (e.g. according to a currently possible sharing split).

The measurement threshold may, for example, be a s-Measure value as defined for 5G NR systems. For example, if the user equipment has been configured with s-Measure (e.g. in a connected state of the user equipment) and the user equipment does not have any detected intra-frequency cells (e.g. any neighbor cell on the serving carrier), the user equipment may allocate all potential intra-frequency SSB measurement occasions for intra-frequency measurements even when serving cell quality is lower than set s-Measure.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 10 and 12. The devices 10 and 12 may, for example, be user devices. The devices 10 and 12 are configured to be in a wireless connection on one or more communication channels with a node 14. The node 14 is further connected to a core network 20. In one example, the node 14 may be an access node (such as (e/g)NodeB) 14 providing or serving devices in a cell. In one example, the node 14 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 20 (CN or next generation core NGC). Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), etc.

The device (also called user device, UE, user equipment, user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilize cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities. The device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented. 5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 22, or utilize services provided by them. The communication network may also be able to support the usage of cloud services, for example at least part of core network operations may be carried out as a cloud service (this is depicted in FIG. 1 by "cloud" 24). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 14) and non-real time functions being carried out in a centralized manner (in a centralized unit, CU 18).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 16 in the mega-constellation may cover several satellite-enabled network entities that create on-ground cells. The on-ground cells may be created via an on-ground relay node 14 or by a gNB located on-ground or in a satellite.

It is understandable for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. One of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
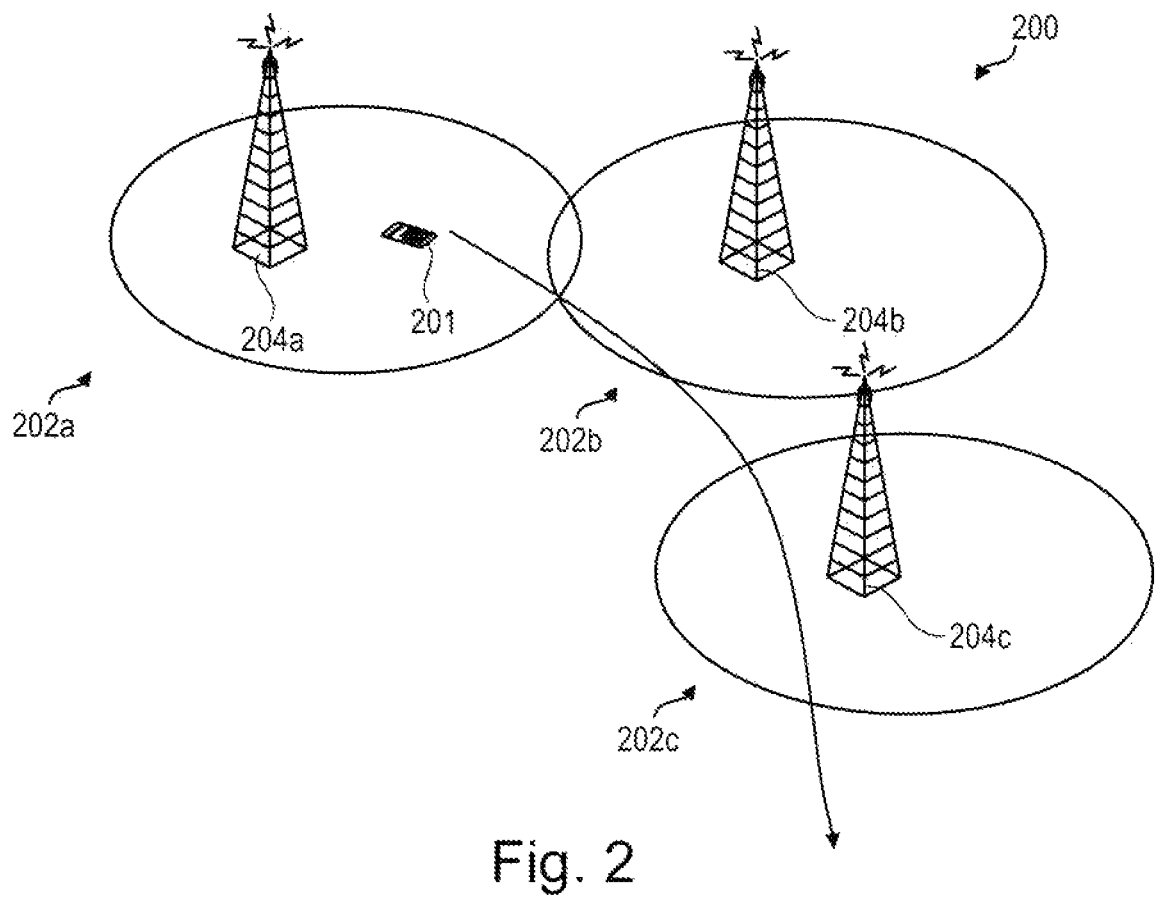
FIG. 2 is a schematic illustration of a wireless communication system.

FIG. 2 is a schematic illustration of a wireless communication system 200. The communication system 200 may be configured to use a time division duplex (TDD) technique for data transmission.

For simplicity, communication system 200 is shown to include three base stations 204a, 204b and 204c and a UE 201. The base stations 204a-c may, for example, be eNodeBs and/or gNBs. That is, the communication system 200 may support a same RAT or different RATs.

Each of the base stations 204a-c may serve UEs within a respective geographical coverage area of service. The base station and its coverage area may collectively be referred to as a "cell". The cells of the communication system 200 are labeled 202a, 202b and 202c.

In this particular example, the UE 201 is moving from the left to the right. Initially, it is associated with the cell 202a. The cell 202a may be a serving cell of the UE 201. The neighbor cell 202b may be on a same carrier as the serving cell 202a. Therefore, the neighbor cell 202b may be referred to as intra-frequency cell. The neighbor cell 202c may be on a carrier different from the serving carrier the serving cell 202a. The carrier of the neighbor cell 202c may be referred to as non-serving carrier. Therefore, the neighbor cell 202c may be referred to as inter-frequency cell.

While moving from the left to the right, the UE 201 is configured to perform neighbor cell measurements of neighbor cells 202b and 202c in accordance with the present subject matter.

Figure 3A:
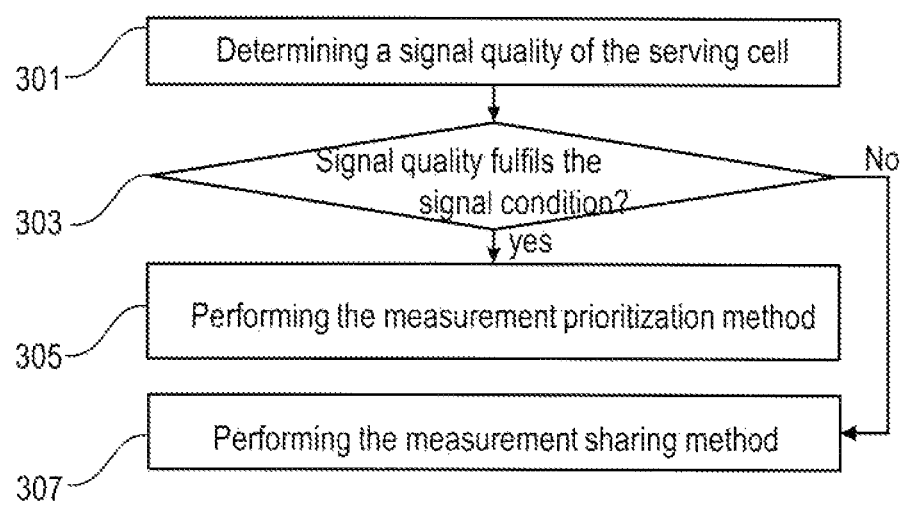
FIG. 3A is a flowchart of a neighbor cell measurement method used in a user equipment (UE) according to an example of the present subject matter.

FIG. 3A is a flowchart of a neighbor cell measurement method used in a UE according to an example of the present subject matter. For the purpose of explanation, the method described in FIG. 3A may be implemented in the system illustrated in FIG. 2, but is not limited to this implementation.

The method starts at step 301, where the UE 201 determines a signal quality of the serving cell 202a. The signal quality may, for example, be a quality of a signal received from the base station 204a. The signal quality may, for example, be a RSRP or a RSRQ measurement. The method then proceeds to step 303, where the UE determines whether the determined signal quality of the serving cell 202a fulfills a predefined signal condition. For example, the UE 201 may compare the determined signal quality with a predefined threshold. If the determined signal quality exceeds the threshold, the signal condition is fulfilled.

Figure 3B:
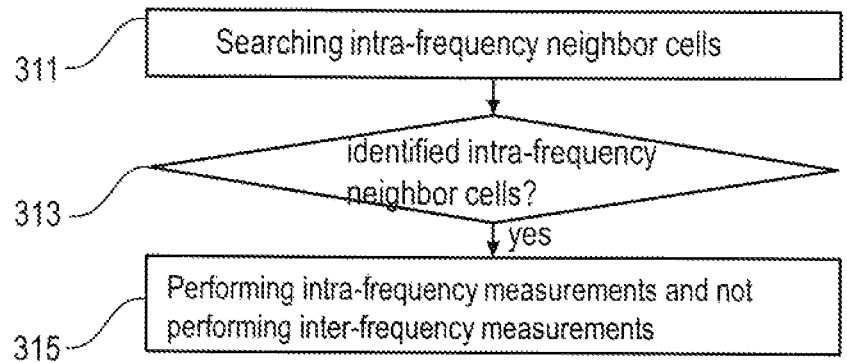
FIG. 3B is a flowchart of a measurement prioritization method according to an example of the present subject matter.
Figure 3C:
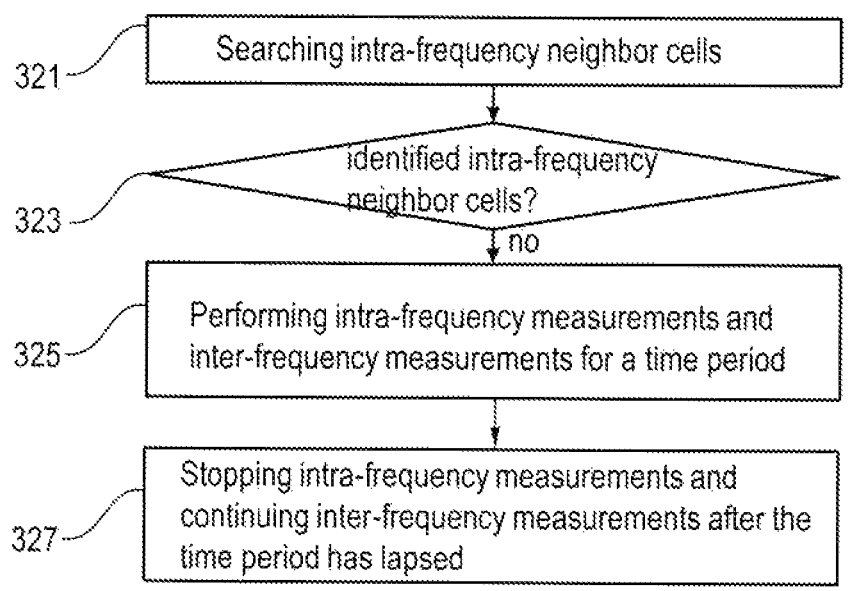
FIG. 3C is a flowchart of a measurement prioritization method according to an example of the present subject matter.
Figure 3D:
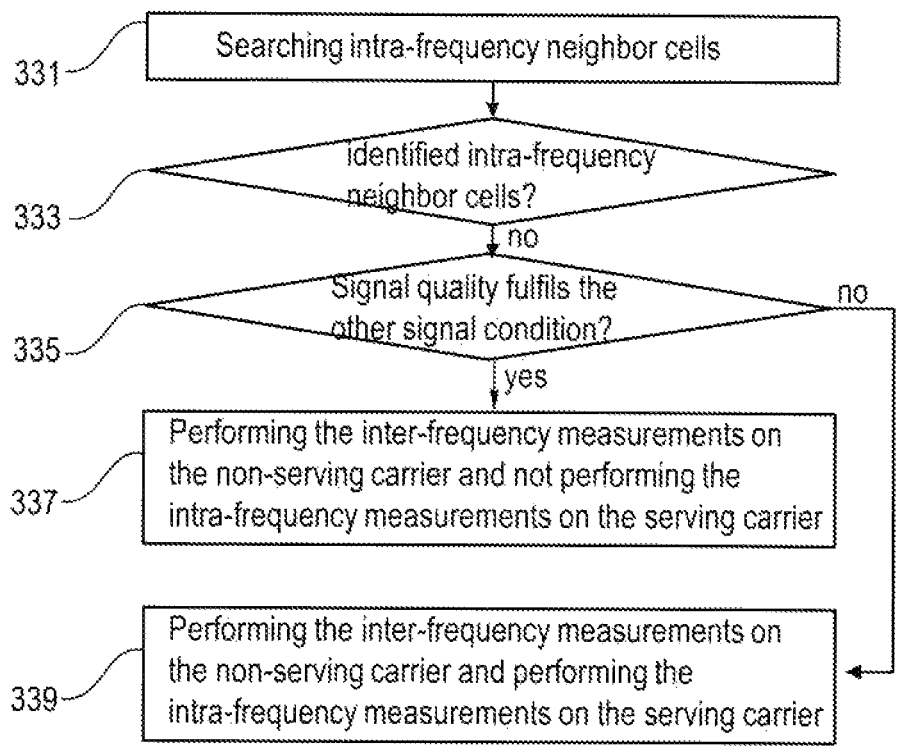
FIG. 3D is a flowchart of a measurement prioritization method according to an example of the present subject matter.

If it is determined that the signal quality of the serving cell 202a fulfills the e.g. low signal condition, the method proceeds to step 305, where the UE 201 performs a measurement prioritization method. FIGS. 3B, 3C and 3D provide examples of the measurement prioritization method.

Figures 5A, 5B:
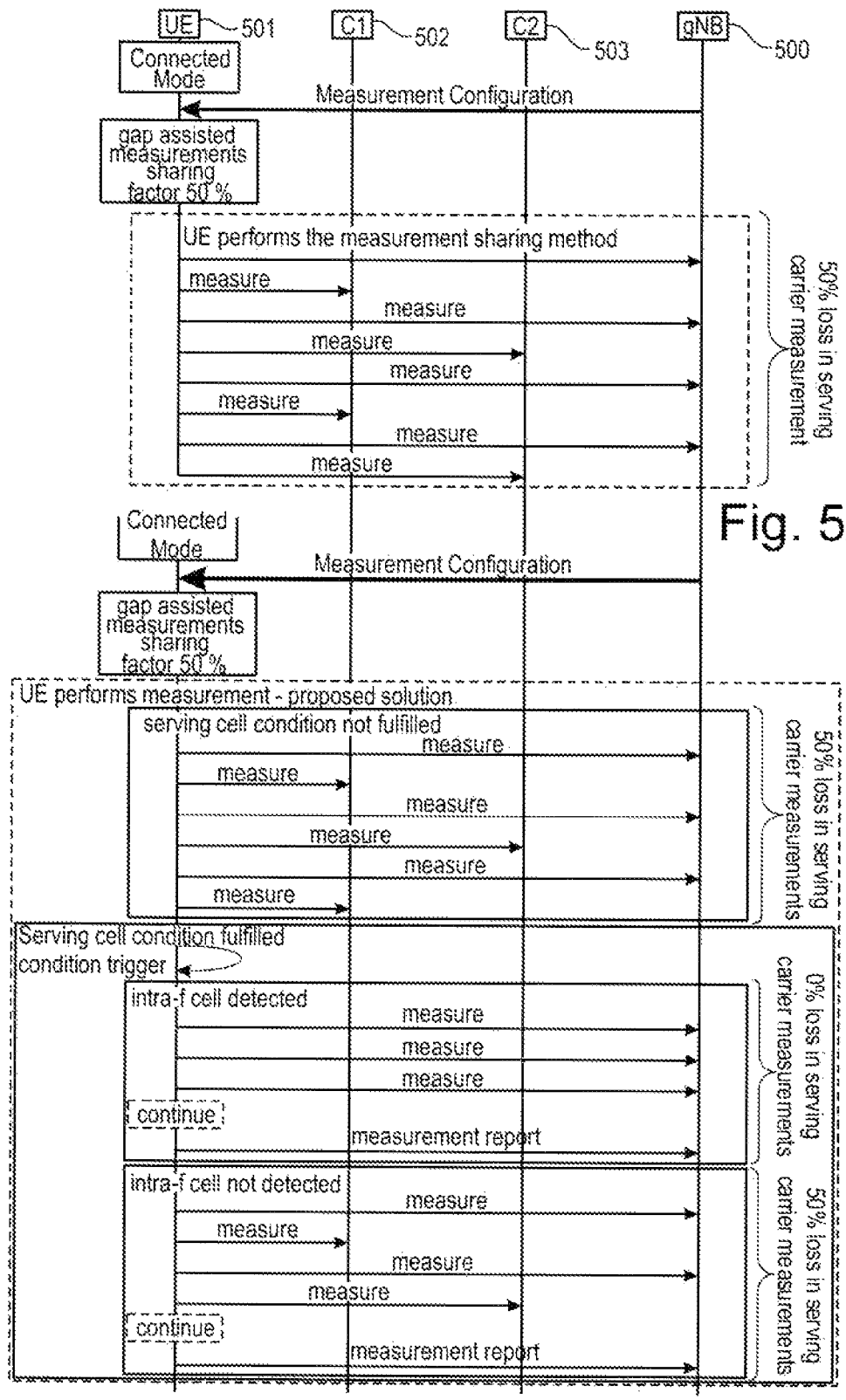
FIG. 5A is a diagram of a signaling method for neighbor cell measurements in accordance with an example.
FIG. 5B is a diagram of a signaling method for neighbor cell measurements in accordance with an example.

If it is determined that the signal quality of the serving cell 202a does not fulfil the signal condition, the method proceeds to step 307, where the UE 201 performs the measurement sharing method as described herein. FIG. 5A provides an example of the measurement sharing method. Hence, the UE 201 does not apply, in step 307, the measurement prioritization method (e.g. the UE 201 may continue using the default measurement method without applying the measurement prioritization method in step 307).

The resulting performed measurements may comprise intra-frequency measurements and/or inter-frequency measurements. The performed measurements may be reported by the UE 201 to the base station 204a. Based on that, the UE 201 may or may not be connected to another cell of the communication system 200. For example, in a connected state, the UE 201 may report the performed measurements to the network for enabling a mobility, handover or other configurations as seen needed by the network. In an idle state or inactive state, the reported measurements may enable a mobility (e.g. cell reselections) of the UE 201.

The UE 201 may continuously repeat steps 301 to 307 until it camps on another serving cell.

FIG. 3B is a flowchart of a measurement prioritization method according to an example of the present subject matter. For the purpose of explanation, the method described in FIG. 3B may be implemented in the system illustrated in FIG. 2, but is not limited to this implementation.

The method starts at step 311, where the UE 201 searches intra-frequency neighbor cells such as cell 202b. The search may be performed in order to detect one or more intra-frequency neighbor cells.

The method then proceeds to step 313, where the UE 201 determines whether the presence of one or more intra-frequency cells is detected. The condition for a detection of the presence of neighbor intra-frequency cells may, for example, be at least one of:
- a number of detected intra-frequency cells exceeds certain predefined/configured number over a certain time.
- the quality of a detected neighbor cell(s) fulfils a quality condition. For example, if a neighbor cell quality e.g. RSRP, exceeds certain absolute threshold or relative threshold (compared to the serving cell), the quality condition is fulfilled.
- a predefined number of SSB(s) is detected from neighboring cell(s). The detected SSBs may be further conditioned with a quality metric e.g. on RSRP values.

If the presence of at least one intra-frequency cell is detected, the method proceeds to step 315, where the UE 201 performs intra-frequency measurements of the detected cells. However, the UE 201 does not perform inter-frequency measurements in step 315. If the UE 201 has not detected any intra-frequency cells, the UE 201 may perform the example method of FIG. 3C or FIG. 3D.

FIG. 3C is a flowchart of a measurement prioritization method according to an example of the present subject matter. For the purpose of explanation, the method described in FIG. 3C may be implemented in the system illustrated in FIG. 2, but is not limited to this implementation.

As with the method of FIG. 3B, the method of FIG. 3C starts at step 321, where the UE 201 searches intra-frequency neighbor cells such as cell 202b. The search may be performed in order to detect one or more intra-frequency neighbor cells. The method then proceeds to step 323, where the UE 201 determines whether the presence of one or more intra-frequency cells is detected. This may, for example, be performed as described in step 313 of FIG. 3B.

If the presence of any intra-frequency cell is not detected by the UE 201, the method proceeds to step 325, where the UE 201 performs at least intra-frequency measurements. In on example, the UE 201 may perform, in step 325, the intra-frequency measurements in step 325. In another example, the UE 201 may perform, in step 325, both the intra-frequency measurements and inter-frequency measurements. The inter-frequency measurements may, for example, be measurements of one or more cells supporting a same RAT as the serving cell. The UE 201 may exclude performing Inter-RAT measurements. The intra-frequency measurement of step 325 comprises a measurement of the serving cell 202a. Step 325 may, for example, be performed for a predefined time period.

After the time period has lapsed, the method proceeds to step 327, where the UE 201 stops intra-frequency measurements and performs inter-frequency measurements. If the UE 201 has already started performing in step 325 the inter-frequency measurements, the UE 201 continues said inter-frequency measurements in step 327.

FIG. 3D is a flowchart of a measurement prioritization method according to an example of the present subject matter. For the purpose of explanation, the method described in FIG. 3D may be implemented in the system illustrated in FIG. 2, but is not limited to this implementation.

As with the method of FIG. 3B, the method of FIG. 3D starts at step 331, where the UE 201 searches intra-frequency neighbor cells such as cell 202b. The search may be performed in order to detect one or more intra-frequency neighbor cells. The method then proceeds to step 333, where the UE 201 determines whether the presence of one or more intra-frequency cells is detected. This may for example be performed as described in step 313 of FIG. 3B.

If the presence of any intra-frequency cell is not detected, the method proceeds to step 335, where the UE 201 determines whether the signal quality of the serving cell 202a fulfills another certain signal condition. The other certain signal condition may be stricter than the signal condition used in step 303 and does not contradict it. For example, the signal condition of step 303 may require the signal quality to be smaller than a first threshold and the other signal condition of step 335 may require the signal quality to be smaller than a second threshold, wherein the second threshold is smaller than the first threshold.

If it is determined that the signal quality of the serving cell 202a fulfills the other signal condition, the method proceeds to step 337, where the UE 201 performs the inter-frequency measurements on the non-serving carrier, but does not perform the intra-frequency measurements on the serving carrier.

If it is determined that the signal quality of the serving cell 202a does not fulfil the other signal condition, the method proceeds to step 339, where the UE 201 performs both the intra-frequency measurements and the inter-frequency measurements. The intra-frequency measurement of step 339 comprises a measurement of the serving cell 202a.

Figure 4:
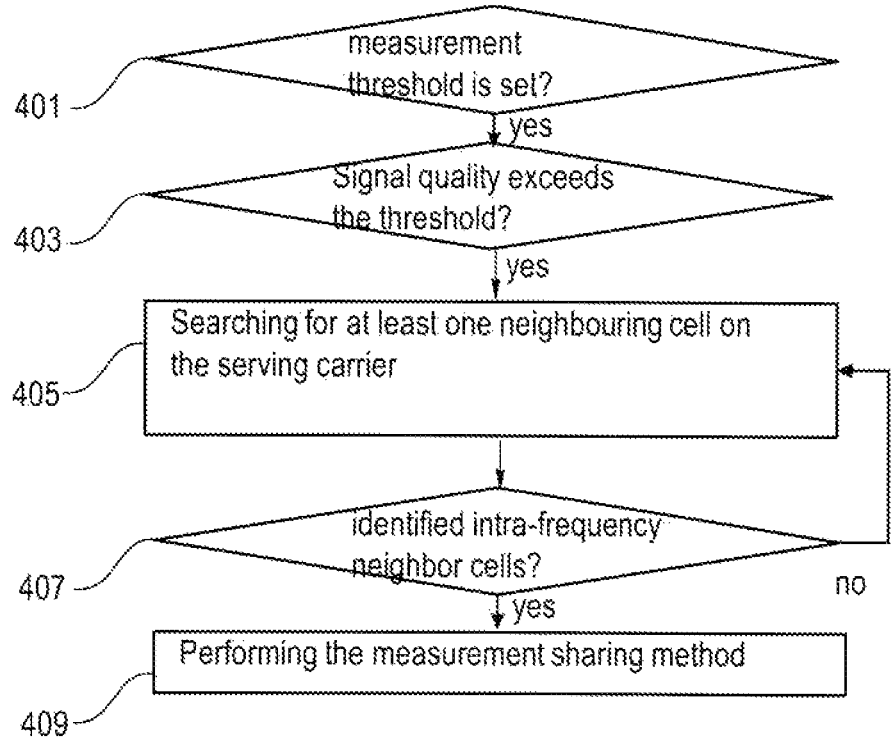
FIG. 4 is a flowchart of a neighbor cell measurement method used in a UE according to an example of the present subject matter.

FIG. 4 is a flowchart of a neighbor cell measurement method used in a UE according to an example of the present subject matter. For the purpose of explanation, the method described in FIG. 4 may be implemented in the system illustrated in FIG. 2, but is not limited to this implementation.

The method starts at step 401, where the UE 201 determines whether a measurement threshold is set for the serving cell 202a. The measurement threshold indicates when the UE 201 is required to perform inter-frequency measurements. In case the UE is in the connected state, the measurement threshold may be the s-Measure value as defined for 5G NR systems.

If it is determined that the measurement threshold is set for the serving cell 202a, the method then proceeds to step 403, where the UE 201 determines whether the signal quality of the serving cell 202a exceeds the measurement threshold.

If it is determined that the signal quality of the serving cell 202a exceeds the measurement threshold, the method proceeds to step 405, where the UE searches for at least one neighboring cell 202b on the serving carrier.

The method proceeds to step 407, where the UE 201 determines whether at least one neighboring cell on the serving carrier is identified.

If no neighboring cell on the serving carrier is identified, the method proceeds back to step 405.

If it is determined that at least one neighboring cell on the serving carrier is identified, the method proceeds to step 409, where the UE performs the measurement sharing method. That is, the UE 201 performs intra-frequency measurements on the serving carrier and inter-frequency measurements on a non-serving carrier.

FIG. 5A is a flow diagram of a signaling method for neighbor cell measurements in accordance with an example. The method may, for example, be performed by a UE 501 in a connected mode (or connected state). The UE 501 may be served by a serving cell 500 having inter-frequency neighboring cells 502 and 503.

The UE 501 may be configured with serving and one or more inter-frequency carriers to measure. As the synchronization signals are overlapping and the UE 501 has a limited searcher capacity, the UE 501 can only measure a limited number of carriers per synchronization occurrence. Hence, the UE 501 has to balance the measurements in a way such that it can fulfil the UE requirements.

The UE 501 is configured with information on how to balance measurements in the connected mode among serving carrier and non-serving carrier using the measurement sharing method. Additionally, the UE 501 may have to apply a carrier specific scaling factor (CSSF) according to UE requirements, when the UE 501 is configured with gap assisted measurements and there are overlaps between gaps and serving carrier measurements. This leads to that the UE 501 has to share the measurement occurrences such that not all serving carrier measurement occurrences are available for measurements.

This is illustrated in FIG. 5A in the section 'UE performs the measurement sharing method'. In this case, the UE 501 may provide about 50% of the serving carrier measurement occurrences available for inter-frequency measurements.

Under a normal condition, this measurement sharing method may not cause any problems, but as the UE 501 reaches the cell edge of the serving cell 500, this may start to impact the measurements on the serving carrier and thereby the connection reliability. This can impact the UE mobility, especially in case the UE is moving, due to reduced availability serving cell measurements. To solve this issue, the measurement sharing method may be used in combination with the measurement prioritization method as described in FIG. 5B.

FIG. 5B illustrates two situations. The serving cell condition is not fulfilled in the first situation, while the serving cell condition is fulfilled (triggered) in the second situation.

Before the serving cell condition (or the certain signal condition) is fulfilled, the UE 501 may perform measurements according to the measurement sharing method. Hence, the UE 501 may measure all configured carriers according to the configured sharing scheme and calculated CSSF. This is illustrated in the part named 'serving cell condition not fulfilled'.

Once the serving cell conditions are fulfilled (illustrated in the box named 'serving cell condition fulfilled'), the UE 501 may evaluate if it has another intra-frequency neighbor cell detected. If this is the case, the UE 501 may apply a balancing rule and allocate all possible intra-frequency measurement occurrence to measure intra-frequency and may stop measuring any other carriers (either completely or only on those occasions overlapping with serving carrier measurement occurrences). In this case, the UE 501 may not miss any measurement occurrences on the serving carrier. This can be applied either for a certain limited time, as long as the condition is fulfilled or until another trigger occurs—e.g. measurement reporting event.

Once the serving cell conditions are fulfilled (illustrated in the box named 'serving cell condition fulfilled'), the UE 501 may evaluate if it has another intra-frequency neighbor cell detected. If this is not the case, the UE 501 may apply the following:

The UE 501 continues to measure serving cell carrier and the UE 501 additionally measures inter-frequency measurements, e.g. other RAT's are not measured.

The UE 501 stops measuring serving cell carrier and the UE only performs inter-frequency measurements (and hence do not perform further intra-frequency measurements or RAT measurements).

Figure 6:
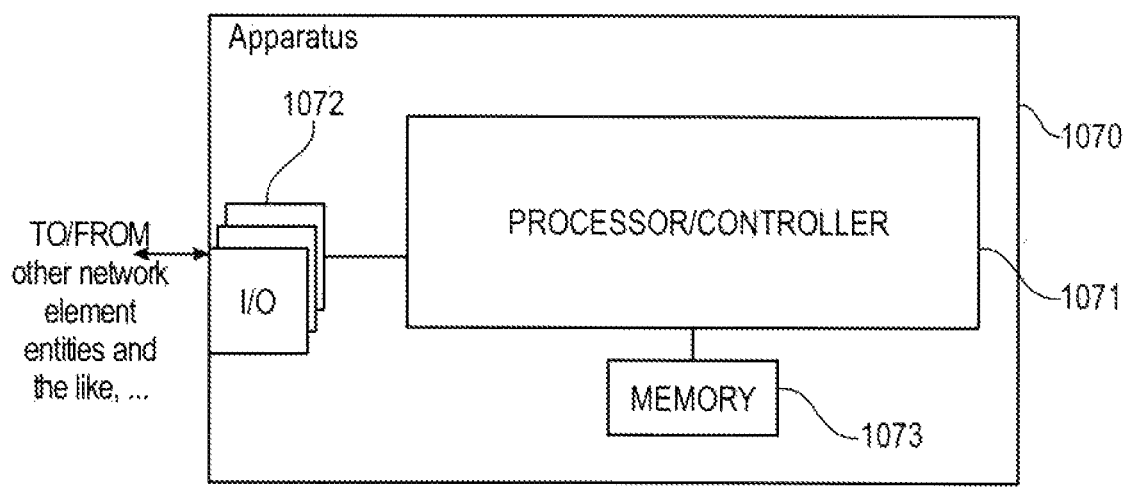
FIG. 6 is a block diagram showing an example of an apparatus according to an example of the present subject matter.

In FIG. 6, a block circuit diagram illustrating a configuration of an apparatus 1070 is shown, which is configured to implement at least part of the present subject matter. It is to be noted that the apparatus 1070 shown in FIG. 6 may comprise several further elements or functions besides those described herein below, which are omitted herein for the sake of simplicity as they are not essential for the understanding. Furthermore, the apparatus may be also another device having a similar function, such as a chipset, a chip, a module etc., which can also be part of an apparatus or attached as a separate element to the apparatus 1070, or the like. The apparatus 1070 may comprise a processing function or processor 1071, such as a central processing unit (CPU) or the like, which executes instructions given by programs or the like related to a flow control mechanism. The processor 1071 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 1072 denotes transceiver or input/output (I/O) units (interfaces) connected to the processor 1071. The I/O units 1072 may be used for communicating with one or more other network elements, entities, terminals or the like. The I/O units 1072 may be a combined unit comprising communication equipment towards several network elements, or may comprise a distributed structure with a plurality of different interfaces for different network elements. Reference sign 1073 denotes a memory usable, for example, for storing data and programs to be executed by the processor 1071 and/or as a working storage of the processor 1071.

The processor 1071 is configured to execute processing related to the above described subject matter. In particular, the apparatus 1070 may be configured to perform at least part of the method as described in connection with FIGS. 3A, 3B, 3C, 3D, 4, 5A and 5B.

The processor 1071 is configured to: in response to determining that a signal quality of a serving cell of the user equipment fulfils a low signal condition: performing intra-frequency measurements on a serving carrier of the serving cell if one or more one or more neighboring cells on the serving carrier are identified by the user equipment, otherwise performing at least inter-frequency measurements on a non-serving carrier.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. 'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

Generally, the program instructions can be executed on one processor or on several processors. In the case of multiple processors, they can be distributed over several different entities. Each processor could execute a portion of the instructions intended for that entity. Thus, when referring to a system or process involving multiple entities, the computer program or program instructions are understood to be adapted to be executed by a processor associated or related to the respective entity.

The invention claimed is:

1. A user equipment for cell measurements comprising:
at least one processor; and
at least one memory storing instructions that, when executed by the at least one processor, cause the user equipment at least to perform:
in response to determining that the user equipment is at a cell edge or moving at a high velocity and a signal quality of a serving cell of the user equipment fulfils a certain signal condition that the signal quality meets a first threshold dependent upon at least one of time or location of the user equipment: performing intra-frequency measurements on a serving carrier of the serving cell if one or more one or more neighboring cells on the serving carrier are identified by the user equipment wherein the intra-frequency measurements exclude inter-RAT measurements, otherwise performing at least inter-frequency measurements on a non-serving carrier based upon the signal quality being smaller than a second threshold, the second threshold being smaller than the first threshold, and
applying a carrier specific scaling factor (CSSF) to each of the intra-frequency measurements and the inter-frequency measurements,
wherein the at least one memory and the instructions, when executed by the at least one processor, further cause the user equipment at least to perform: in response to determining that the signal quality of the serving cell fulfils the signal condition and no neighboring cell on the serving carrier is identified by the user equipment: performing intra-frequency measurements on the serving carrier and inter-frequency measurements on the non-serving carrier for a predefined time period, and after the time period has lapsed stopping the intra-frequency measurements and continuing the performing of the inter-frequency measurements on the non-serving carrier, wherein a number of the identified neighboring cells is higher than a predefined minimum number measured over a certain time, wherein each cell of the identified neighboring cells has a signal quality that fulfils a signal quality selection criterion.

2. The user equipment of claim 1, wherein the at least one memory and the instructions, when executed by the at least one processor, further cause the user equipment at least to perform: in response to determining that the signal quality of the serving cell of the user equipment fulfils the signal condition and no neighboring cell on the serving carrier is identified: performing intra-frequency measurements on the serving carrier and inter-frequency measurements on the non-serving carrier.

3. The user equipment of claim 1, wherein the at least one memory and the instructions, when executed by the at least one processor, further cause the user equipment at least to perform: in response to determining that the signal quality of the serving cell does not fulfil the signal condition: performing inter-frequency measurements on the non-serving carrier and intra-frequency measurements on the serving carrier.

4. The user equipment of claim 1, wherein the at least one memory and the instructions, when executed by the at least one processor, further cause the user equipment at least to perform: in response to determining that the signal quality of the serving cell fulfils the signal condition and no neighboring cell on the serving carrier is identified by the user equipment:
   determining if the signal quality of the serving cell fulfils a second signal condition,
   in case the signal quality of the serving cell fulfils the second signal condition, performing the inter-frequency measurements on the non-serving carrier, otherwise performing the intra-frequency measurements on the serving carrier and inter-frequency measurements on the non-serving carrier.

5. The user equipment of claim 1, the signal quality selection criterion requiring the signal quality of said identified cell to be higher than a predefined quality threshold, the quality threshold being an absolute value or a value relative to the signal quality of the serving cell.

6. The user equipment of claim 1, wherein a number of synchronization signal blocks (SSBs) received from each of the identified neighboring cells is higher than a threshold and/or signal values of the SSBs fulfil a quality metric.

7. The user equipment of claim 1, the user equipment having a user equipment state, wherein the user equipment state is a connected state, inactive state or idle state.

8. The user equipment of claim 1, the user equipment being comprised in a communication system supporting a same radio access technology or different radio access technologies.

9. A method used in a user equipment, comprising: in response to determining that the user equipment is at a cell edge or moving at a high velocity and a signal quality of a serving cell of the user equipment fulfils a certain signal condition that the signal quality meets a first threshold dependent upon at least one of time or location of the user equipment: performing intra-frequency measurements on a serving carrier of the serving cell if one or more one or more neighboring cells on the serving carrier are identified by the user equipment, wherein the intra-frequency measurements exclude inter-RAT measurements, otherwise performing at least inter-frequency measurements on a non-serving carrier based upon the signal quality being smaller than a second threshold, the second threshold being smaller than the first threshold, and
   applying a carrier specific scaling factor (CSSF) to each of the intra-frequency measurements and the inter-frequency measurements,
   the one or more one or more neighboring cells being identified by the user equipment, wherein the identifying comprises detecting a presence of the one or more one or more neighboring cells in accordance with a detection condition, wherein the detection condition comprises at least one of: a number of the identified neighboring cells is higher than a predefined minimum number measured over a certain time; each cell of the identified neighboring cells has a signal quality that fulfils a signal quality selection criterion; and a number of synchronization signal blocks (SSBs) received from each of the identified neighboring cells is higher than a threshold and/or signal values of the SSBs fulfil a quality metric.

10. The method of claim 9, wherein performing at least inter-frequency measurements on the non-serving carrier comprises: performing intra-frequency measurements on the serving carrier and inter-frequency measurements on the non-serving carrier, in response to determining that the signal quality of the serving cell does not fulfil the signal condition: performing inter-frequency measurements on the non-serving carrier and intra-frequency measurements on the serving carrier.

11. The method of claim 9, wherein performing at least inter-frequency measurements on the non-serving carrier comprises: performing intra-frequency measurements on the serving carrier and inter-frequency measurements on the non-serving carrier for a predefined time period, and after the time period has lapsed stopping the intra-frequency measurements and continuing the performing of the inter-frequency measurements on the non-serving carrier.

12. The method of claim 9, wherein performing at least inter-frequency measurements on the non-serving carrier comprises: performing intra-frequency measurements on the serving carrier for a predefined time period, and after the time period has lapsed stopping the intra-frequency measurements and performing of the inter-frequency measurements on the non-serving carrier.

13. A non-transitory computer readable medium comprising instructions for causing a user equipment for performing at least the following: in response to determining that the user equipment is at a cell edge or moving at a high velocity and a signal quality of a serving cell of the apparatus fulfils a certain signal condition that the signal quality meets a first threshold dependent upon at least one of time or location of the user equipment: performing intra-frequency measurements on a serving carrier of the serving cell if one or more one or more neighboring cells on the serving carrier are identified by the user equipment, wherein the intra-frequency measurements exclude inter-RAT measurements, otherwise performing at least inter-frequency measurements on a non-serving carrier based upon the signal quality being smaller than a second threshold, the second threshold being smaller than the first threshold, and
   applying a carrier specific scaling factor (CSSF) to each of the intra-frequency measurements and the inter-frequency measurements,
   the one or more one or more neighboring cells being identified by the user equipment, wherein the identifying comprises detecting a presence of the one or more one or more neighboring cells in accordance with a detection condition, wherein the detection condition comprises at least one of: a number of the identified neighboring cells is higher than a predefined minimum number measured over a certain time; each cell of the identified neighboring cells has a signal quality that fulfils a signal quality selection criterion; and a number of synchronization signal blocks (SSBs) received from each of the identified neighboring cells is higher than a threshold and/or signal values of the SSBs fulfil a quality metric.

* * * * *